US012407118B2

(12) United States Patent
Sadakata

(10) Patent No.: US 12,407,118 B2
(45) Date of Patent: Sep. 2, 2025

(54) TERMINAL UNIT

(71) Applicant: SUMITOMO WIRING SYSTEMS, LTD., Mie (JP)

(72) Inventor: Shifumi Sadakata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 349 days.

(21) Appl. No.: 17/965,221

(22) Filed: Oct. 13, 2022

(65) Prior Publication Data

US 2023/0128481 A1 Apr. 27, 2023

(30) Foreign Application Priority Data

Oct. 27, 2021 (JP) ................................ 2021-175278

(51) Int. Cl.
*H01R 11/12* (2006.01)
*H01R 11/26* (2006.01)

(52) U.S. Cl.
CPC ............ *H01R 11/12* (2013.01); *H01R 11/26* (2013.01)

(58) Field of Classification Search
CPC ........ H01R 11/12; H01R 11/26; H01R 4/305; H01R 4/34
See application file for complete search history.

(56) References Cited

U.S. PATENT DOCUMENTS 5,997,341 A * 12/1999 Ushiyama ................ H01R 4/34 439/480
6,428,363 B2 * 8/2002 Tamai .................. H01R 11/282 439/759
7,530,843 B1 * 5/2009 Tesfay ................. H01R 13/521 439/587

FOREIGN PATENT DOCUMENTS

JP 2000-208172 A 7/2000
JP 2006-324068 A 11/2006
JP 2014-154396 A 8/2014

* cited by examiner

*Primary Examiner* — Briggitte R. Hammond
(74) *Attorney, Agent, or Firm* — Venjuris, P.C.

(57) ABSTRACT

A terminal unit 1 includes: a terminal fitting 10; and a holder 50. The terminal fitting 10 includes a connection portion 10A in which a bolt insertion hole 10C is formed, and the holder 50 includes a main body portion 50A that is configured to be attached to the connection portion 10A and a detent 50B that protrudes from the main body portion 50A and prevents the terminal fitting 10 from rotating.

5 Claims, 14 Drawing Sheets

TERMINAL UNIT

CROSS-REFERENCE TO RELATED APPLICATIONS

This application is based on and claims priority from Japanese Patent Application No. 2021-175278, filed on Oct. 27, 2021, with the Japan Patent Office, the disclosure of which is incorporated herein in its entirety by reference.

TECHNICAL FIELD

The present disclosure relates to a terminal unit.

BACKGROUND

Japanese Patent Laid-open Publication No. 2014-154396 discloses a noise filter built-in connector that has a ground connection terminal that is bolted to a panel of a vehicle body. In this connector, a locking piece that is provided on the ground connection terminal is inserted into a groove that is formed in a panel of a vehicle body. As a result, it is possible to fix the ground connection terminal to the panel of the vehicle body while preventing the ground connection terminal from rotating with the bolt when the bolt is tightened. The techniques disclosed in Japanese Patent Laid-open Publication Nos. 2000-208172 and 2006-324068 are also known as techniques for preventing a terminal from rotating.

SUMMARY

When the position of the groove is changed in the panel of the vehicle body, a fastening unit, a fastening mating member, or the like, the position of the locking piece also needs to correspond to the position of the groove. In such a case, a metal mold for the ground connection terminal in which the position of the locking piece corresponds to the position of the groove needs to be newly manufactured, which increases costs.

A terminal unit according to the present disclosure has been completed based on the circumstances as described above, and aims to make it easier to address changes in a connection position.

A terminal unit according to the present disclosure includes:

a terminal fitting; and a holder, wherein the terminal fitting includes a connection portion in which a bolt insertion hole is formed, and the holder includes a main body portion that is attached to the connection portion and a detent that protrudes from the main body portion and prevents the terminal fitting from rotating.

According to the present disclosure, it is possible to make it easier to address changes in the shape of the connection target.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
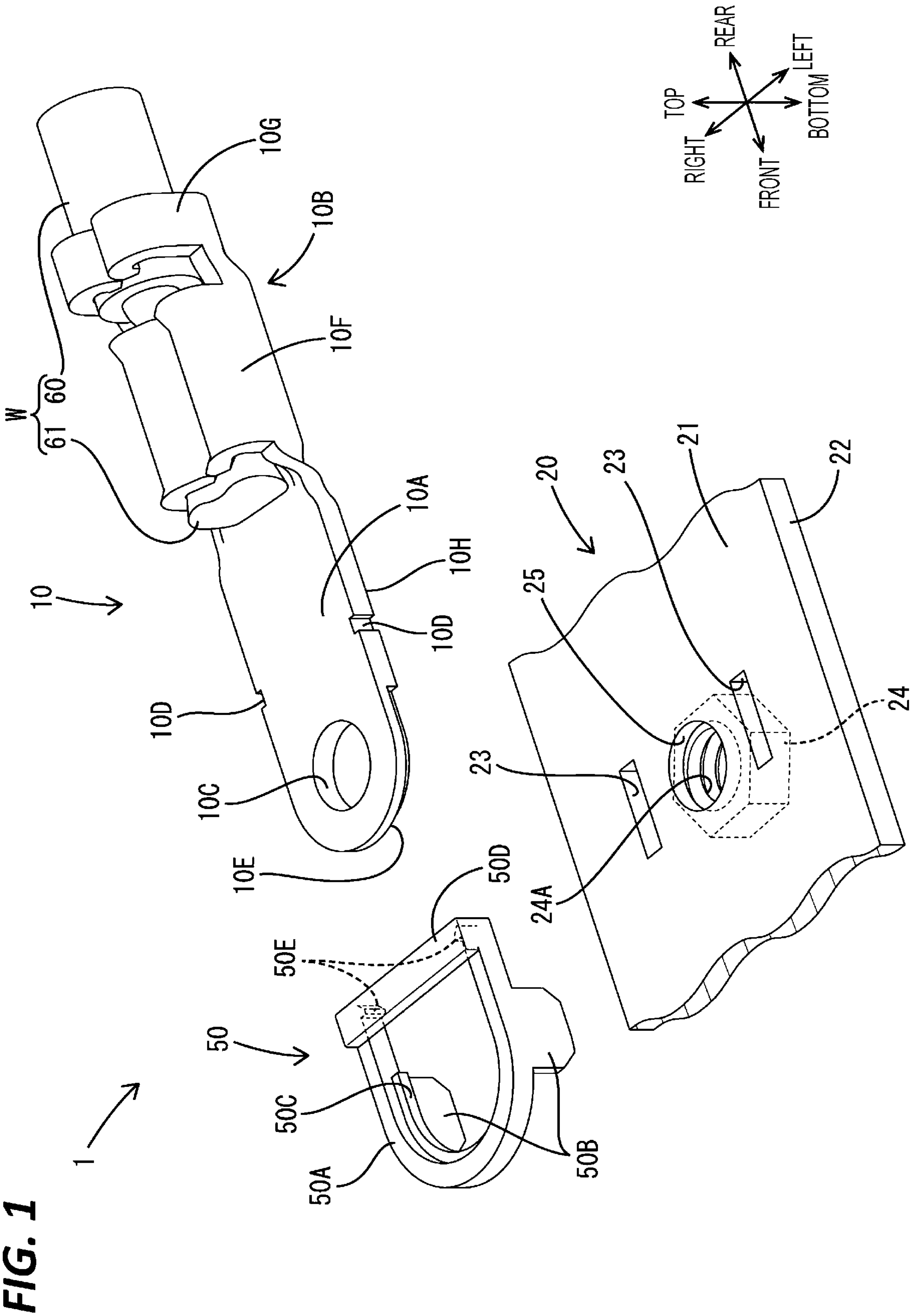
FIG. 1 is an exploded perspective view of a terminal unit according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure will be listed and described.

(1) A terminal unit according to the present disclosure is a terminal unit including a terminal fitting and a holder. The terminal fitting includes a connection portion in which a bolt insertion hole is formed, and the holder includes a main body portion that is configured to be attached to the connection portion and a detent that protrudes from the main body portion and prevents the terminal fitting from rotating. With this configuration, the main body portion of the holder is configured to be attached to the connection portion of the terminal fitting. Therefore, it is unnecessary to newly manufacture a mold for the terminal fitting, and it is possible to mold the detent of the holder so that the position thereof matches the connection target to which the connection portion is to be connected, and easily address changes in the connection position.

(2) It is preferable that a lower surface of the connection portion is provided with a contact surface for establishing an electrical connection, and the main body portion surrounds an outer peripheral portion of the connection portion outside the contact surface. With this configuration, the holder does not prevent the contact surface of the connection portion and the connection target from coming into contact with each other, so that the electrical connection performance between the terminal fitting and the connection target is not impaired.

(3) It is preferable that an outer peripheral surface side of the contact surface in an outer peripheral edge of the connection portion is provided with a recess, and the holder includes a first pressing portion that is configured to be fitted to the recess. With this configuration, the first pressing portion enables the holder to be held by the terminal fitting.

(4) It is preferable that the main body portion has a U shape in a plan view, and surrounds a region from left and right end portions to a front end portion of the connection portion. With this configuration, it is possible to attach the main body portion to the connection portion by inserting the main body portion into the connection portion from the front side, and therefore it is easier to fit the first pressing portion to the recess.

(5) It is preferable that the holder includes a second pressing portion that bridges between the left and right end portions of the main body portion and is configured to sandwich and hold the connection portion, together with the first pressing portion. With this configuration, the first pressing portion and the second pressing portion sandwich and hold the connection portion, and thus the holder can more desirably hold the terminal fitting. Furthermore, the second pressing portion bridges between the left and right end portions of the main body portion, and therefore, it is possible to make the main body portion less deformable.

(6) It is preferable that the second pressing portion is provided on the opposite side of the first pressing portion with respect to the bolt insertion hole. With this configuration, the first pressing portion and the second pressing portion surround the head of the bolt inserted into the bolt insertion hole. Therefore, the second pressing portion restricts the holder from being moved by the head of the bolt in a direction in which the connection portion becomes detached from the connection portion, and the main body portion can be made less likely to become detached from the connection portion.

(7) It is preferable that either one of the holder and the connection portion includes a pair of protruding locking portions respectively on two edge portions thereof in a left-right direction, and the other includes a pair of locking recesses respectively in two edge portions thereof in the left-right direction, to which the locking portions are fitted and locked. With this configuration, it is possible to more reliably prevent the main body portion from becoming detached from the connection portion.

First Embodiment

Figure 2:
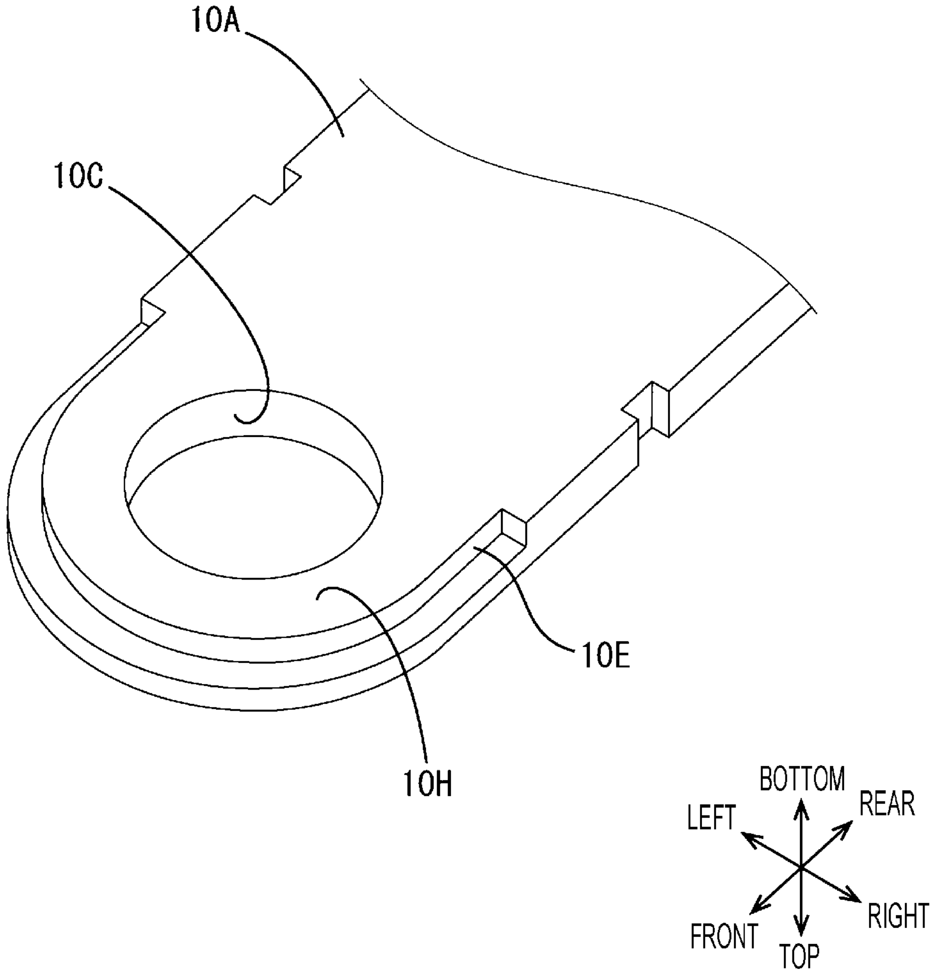
FIG. 2 is an enlarged perspective view of a connection portion.
Figure 3:
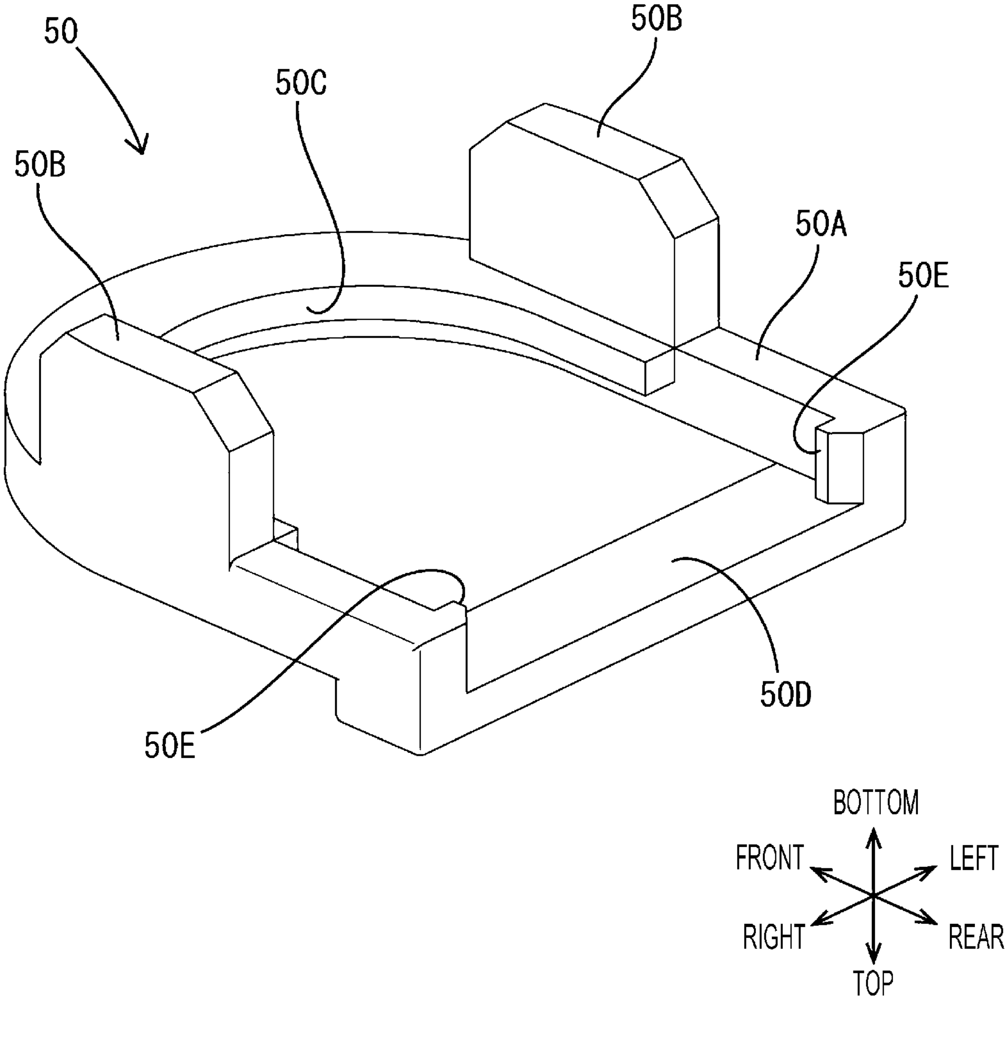
FIG. 3 is a perspective view of a holder.

Hereinafter, a first embodiment that embodies the present disclosure will be described with reference to FIGS. 1 to 9. A terminal unit 1 according to a first embodiment is for fixing and connecting a terminal fitting 10 to a ground surface 21 of a mating fastening member 20 that is a connection target to be connected to the body of a vehicle, or the like in a surface contact state so as to be electrically conductive. In the present first embodiment, regarding a front-rear direction, the left side in FIG. 1 is defined as a front side, and the right side is defined as a rear side. Regarding a top-bottom direction, the directions shown in FIG. 1 are defined as upward and downward as they are. Regarding a left-right direction, the back side of FIG. 1 is defined as a right side, and the front side is defined as a left side. Note that the vertical orientation in FIGS. 2, 3, and 7 is opposite to that in FIG. 1.

As shown in FIG. 1, the terminal unit 1 according to the present embodiment includes the terminal fitting 10 and a holder 50 that is made of a synthetic resin.

Regarding Mating Fastening Member

The mating fastening member 20 includes a panel 22 that is made from a flat plate-shaped metal material, and a metal nut 24 that is fixed to the lower surface (the back surface) of the panel 22 through welding or the like so as to be electrically conductive. The upper surface of the panel 22 is the ground surface 21 for conductive connection with the terminal fitting 10. The mating fastening member 20 according to the first embodiment is a member that is intended for grounding a component attached thereto.

The panel 22 is provided with a pair of receiving holes 23 that extend through the panel 22 in the plate thickness direction thereof. The opening of each of these receiving holes 23 has a rectangular shape that is elongated in the front-rear direction. The receiving holes 23 have a positioning function that is the function of determining the horizontal position of the terminal fitting 10 on the upper surface of the panel 22, and a detent function that is the function of preventing the terminal fitting 10 from rotating together with a bolt 51 when the bolt 51 is tightened.

The metal nut 24 is provided between the pair of receiving holes 23. The panel 22 is provided with a through hole 25 that is positioned coaxially with a screw hole 24A that is formed in the nut 24.

Regarding Terminal Fitting

The terminal fitting 10 is formed by subjecting a metal plate punched into a predetermined shape to bending processing or the like. The terminal fitting 10 is formed by forming a flat plate-shaped connection portion 10A and an open barrel-shaped electrical wire connection portion 10B so as to be integrated with each other.

The connection portion 10A has a strip shape extending in the front-rear direction. The lower surface of the connection portion 10A is a flat contact surface 10H that comes into contact with the ground surface 21 of the mating fastening member 20 and establishes an electrical connection with the mating fastening member 20 (see FIG. 2). A circular bolt insertion hole 10C is formed in a front end portion of the connection portion 10A so as to extend through the front end portion in the plate thickness direction thereof. Locking recesses 10D, which are rectangular and are recessed toward a central position in the left-right direction, are respectively formed in the two edges of the connection portion 10A in the left-right direction, at positions rearward of the bolt insertion hole 10C. The locking recesses 10D are formed by notching the connection portion 10A over the entire thickness thereof in the plate thickness direction thereof. A recess 10E that is recessed upward is formed in the lower surface of the front end edge (outer peripheral edge) of the connection portion 10A (see FIG. 2). The recess 10E is formed in the outer peripheral edge of the front end edge of the connection portion 10A so as to continuously surround the left side, the front side, and the right side of the bolt insertion hole 10C at the outer peripheral edge portion of the front edge portion of the connection portion 10A (see FIG. 2). In other words, the recess 10E is formed in the outer peripheral surface side of the contact surface 10H.

The electrical wire connection portion 10B includes a wire barrel portion 10F and an insulation barrel portion 10G located rearward of the wire barrel portion 10F. A conductor 61, which is exposed by removing an insulating coating 60 from a front end of an electrical wire W, is fixed to the wire barrel portion 10F so as to be conductive. A region of the front end portion of the electrical wire W where the insulating coating 60 is not removed is fixed to the insulation barrel portion 10G.

Regarding Holder

The holder 50 includes a main body portion 50A, a pair of detents 50B, a first pressing portion 50C, a second pressing portion 50D, and a pair of locking portions 50E. The main body portion 50A has a U shape in a plan view, and is provided so as to surround a region from the left and right end portions to the front end portion of the connection portion 10A.

As shown in FIG. 3, the pair of detents 50B are provided so as to respectively protrude downward from the lower surfaces of left and right portions of the main body portion 50A. The lower end portion of each detent 50B has slopes that extend downward toward a central position in the front-rear direction. The inner surfaces of the pair of detents 50B in the left-right direction oppose each other so as to be parallel with each other. These detents 50B are provided so as to sandwich the bolt insertion hole 10C in the left-right direction when the holder 50 is attached to the connection portion 10A (see FIG. 7).

The first pressing portion 50C are provided so as to extend inward from a lower end portion of the inner surface of the main body portion 50A. The first pressing portion 50C has a U shape in a plan view. The left and right rear ends of the first pressing portion 50C are flush with the respective rear ends of the pair of detents 50B. The first pressing portion 50C is provided so as to be fitted to the recess 10E and face a downward surface 10J of the recess 10E so that the first pressing portion 50C can come into contact therewith (see FIG. 6).

The second pressing portion 50D is provided so as to extend in the left-right direction, protrude upward from the respective upper surfaces of the left and right portions of the main body portion 50A, and bridge between the respective rear end portions of the left and right end portions of the main body portion 50A (See FIG. 1). The second pressing portion 50D is provided so as to face the upper surface of the connection portion 10A so that the second pressing portion 50D can come into contact therewith (see FIG. 6). The second pressing portion 50D is provided on the opposite side of the first pressing portion 50C with respect to the bolt insertion hole 10C (see FIG. 9).

The pair of locking portions 50E each have a protruding shape and are provided so as to be respectively continuous with the inner surfaces of the main body portion 50A in the left-right direction and with the lower surface of the second pressing portion 50D. These locking portions 50E are provided on the two edge portions of the main body portion 50A in the left-right direction. These locking portions 50E protrude from the inner surfaces of the main body portion 50A in the left-right direction, toward a central position in the left-right direction. The rear surfaces of these locking portions 50E are inclined inward in the left-right direction and forward. The front surfaces of these locking portions 50E are orthogonal to the front-rear direction. These locking portions 50E are fitted into, and are locked to, the locking recesses 10D formed in the two end portions of the terminal fitting 10 in the left-right direction (see FIGS. 6 and 7).

Assembly of Holder and Terminal Fitting

An example of assembly of the holder 50 and the terminal fitting 10 will be described. First, the orientation of the holder 50 is adjusted so that the second pressing portion 50D is located on the rear side and the second pressing portion 50D is located upward of the main body portion 50A.

Figure 4:
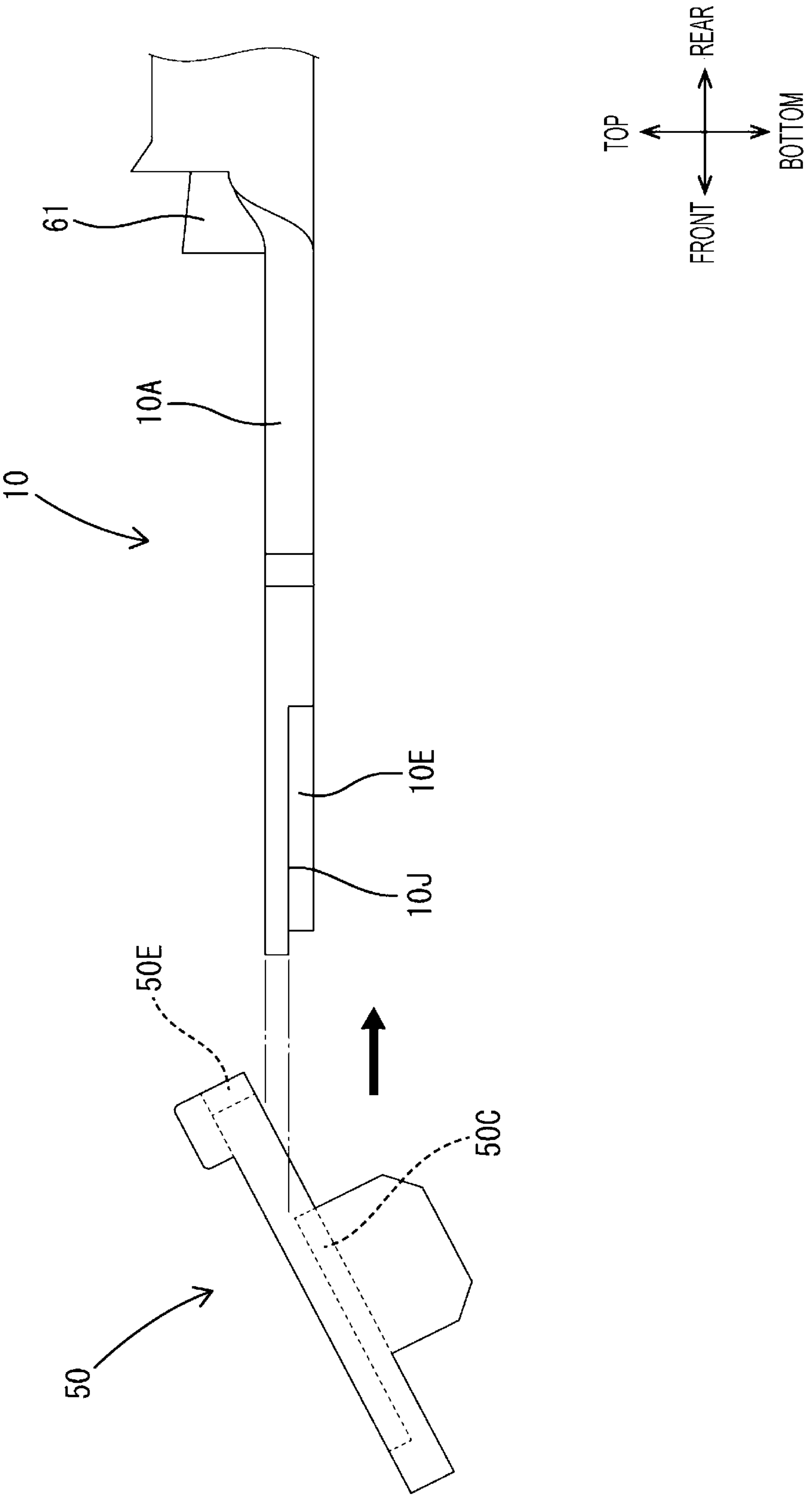
FIG. 4 is a side view showing a state in which the holder that is inclined is provided forward of a terminal fitting.

Next, the holder 50 is attached to the connection portion 10A from the front side. Specifically, the rear side of the main body portion 50A is lifted so as to be higher than the front side, and the holder 50 is brought closer to the connection portion 10A from the front side. At this time, as shown in FIG. 4, the first pressing portion 50C is positioned downward of the downward surface 10J of the recess 10E of the connection portion 10A, the pair of locking portions 50E are positioned upward of the upper surface of the connection portion 10A, and the holder 50 is brought closer to the connection portion 10A from the front side. At this time, the holder 50 is brought closer to the connection portion 10A so as to pass through the area surrounded by the main body portion 50A and the second pressing portion 50D.

Figure 5:
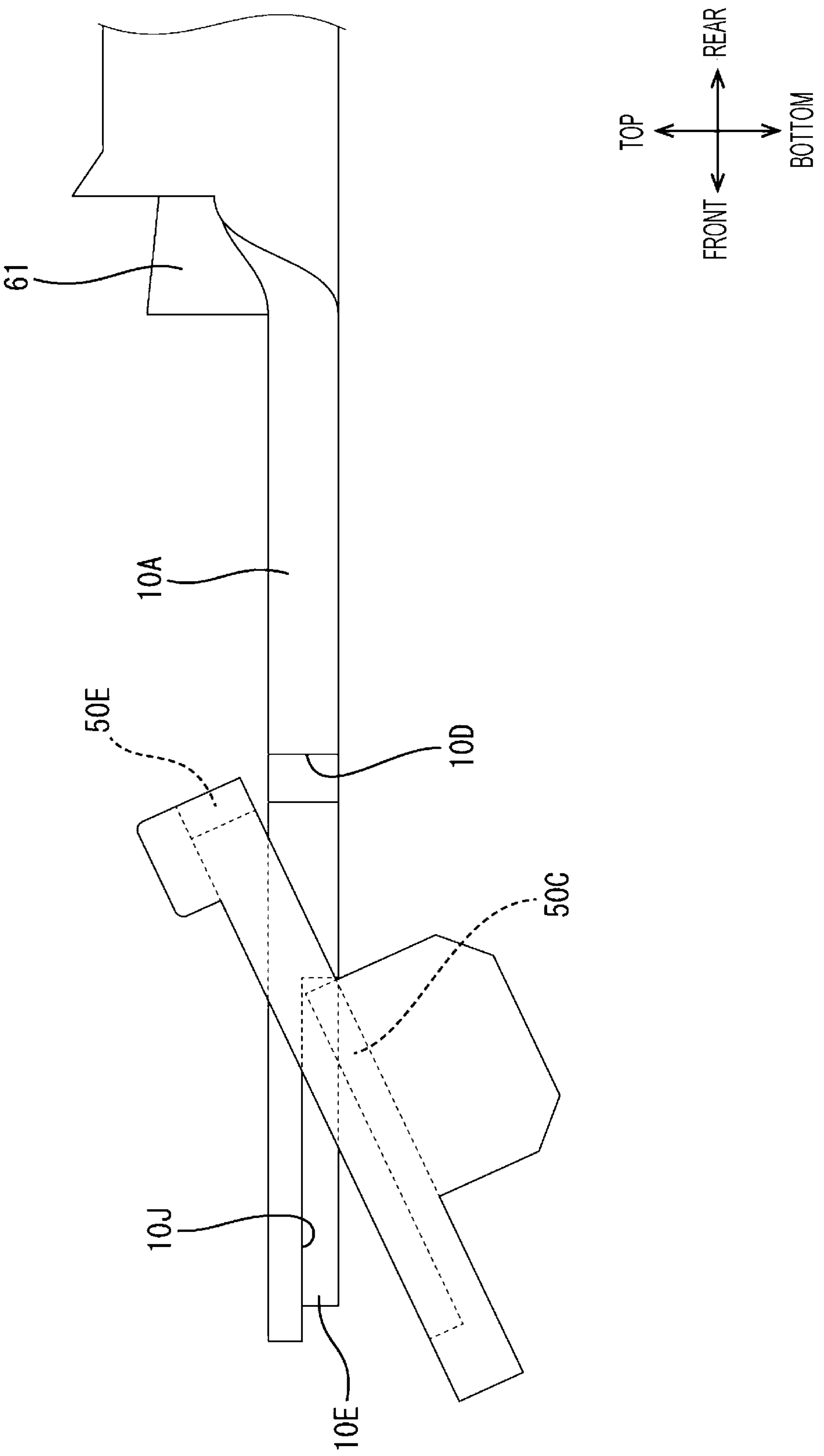
FIG. 5 is a side view showing a state in which the holder is brought closer to the connection portion from the front side.

Thereafter, as shown in FIG. 5, the first pressing portion 50C is positioned downward of the downward surface 10J of the recess 10E of the connection portion 10A, and the pair of locking portions 50E are positioned upward of the pair of locking recesses 10D. Thereafter, the orientation of the holder 50 is changed so that the main body portion 50A is parallel to the front-rear direction. At this time, the first pressing portion 50C is brought closer to the recess 10E of the connection portion 10A from below, and is fitted to the recess 10E so that the first pressing portion 50C can face and come into contact with the downward surface 10J of the recess 10E, and the pair of locking portions 50E are brought closer to the pair of locking recesses 10D from above and are fitted thereinto. As a result, the second pressing portion 50D sandwiches and holds the connection portion 10A, together with the first pressing portion 50C. That is to say, the connection portion 10A is sandwiched between the second pressing portion 50D and the first pressing portion 50C from one side and the other side in the plate thickness direction thereof.

Figure 6:
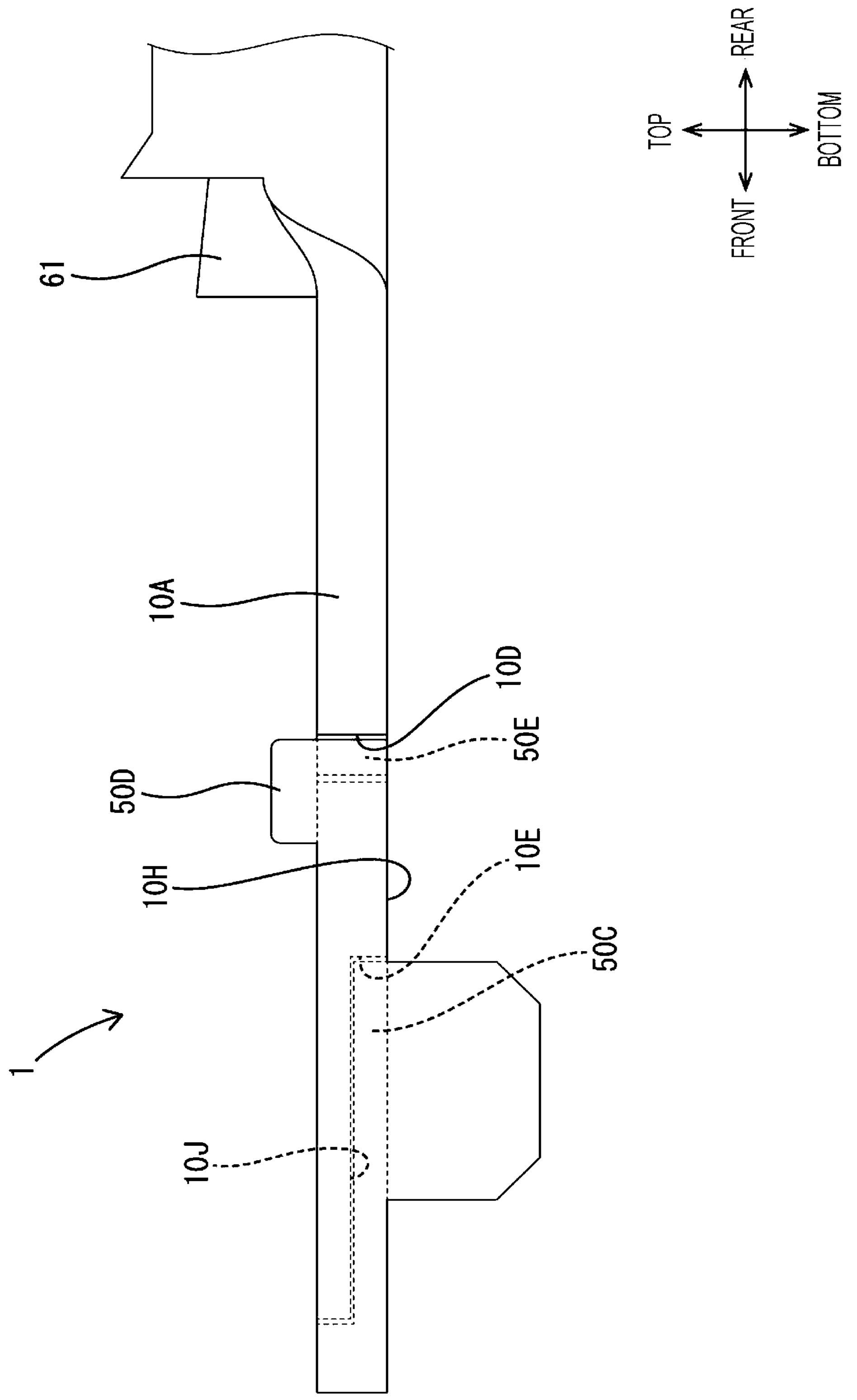
FIG. 6 is a side view showing a state in which the holder is attached to the connection portion.
Figure 7:
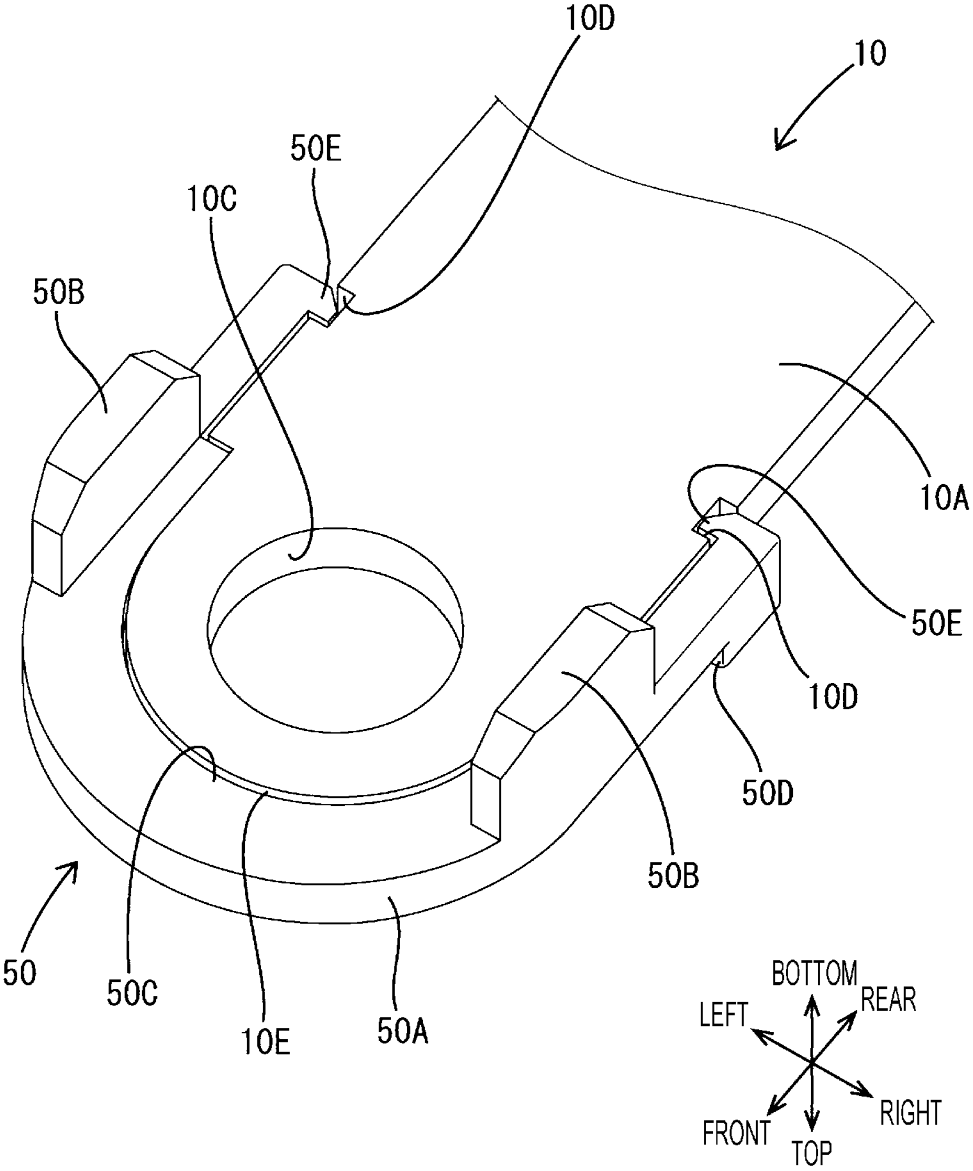
FIG. 7 is a perspective view showing a state in which the holder is attached to the connection portion.
Figure 8:
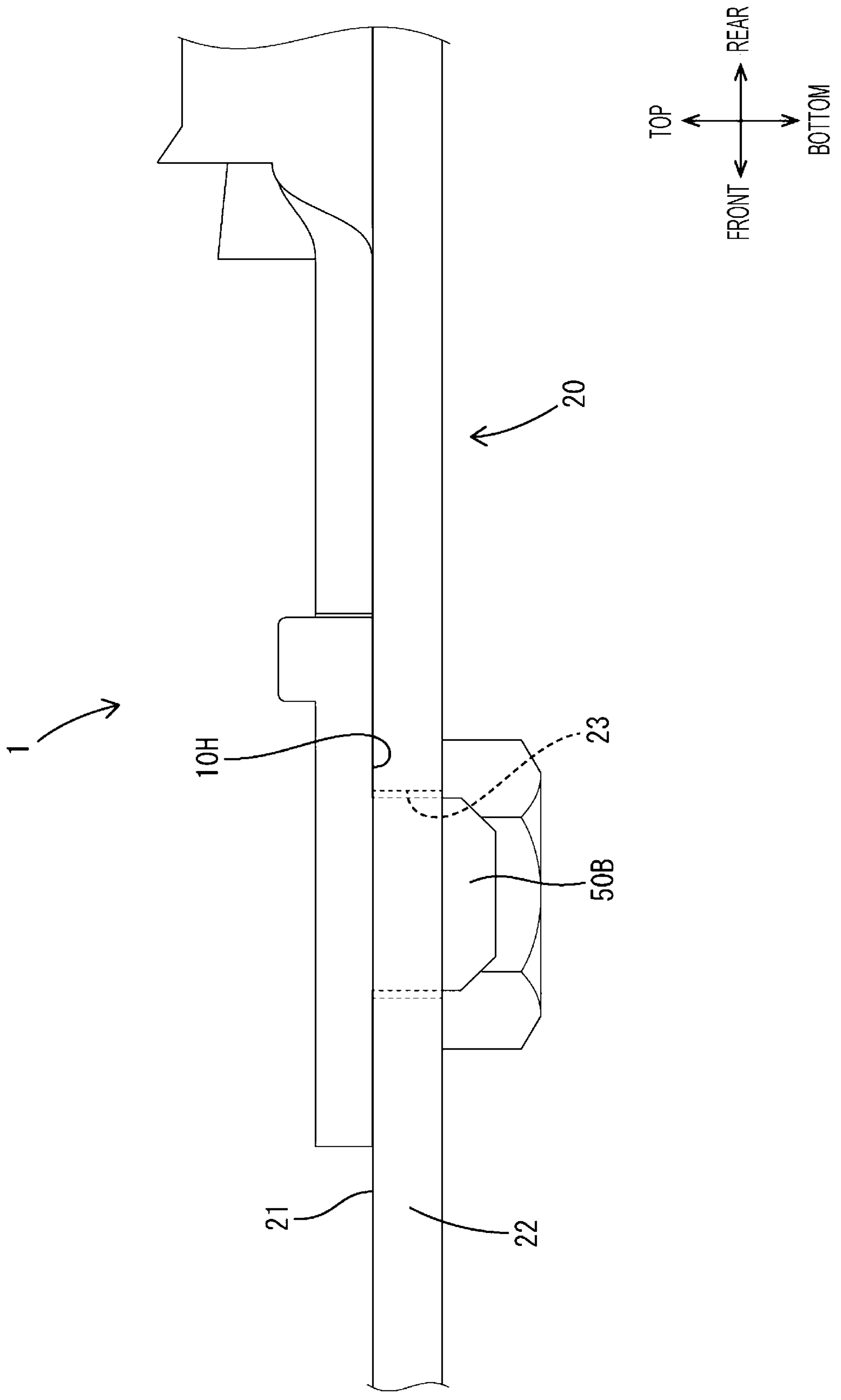
FIG. 8 is a side view showing a state in which a detent is inserted into a receiving hole and the terminal unit is brought into contact with a ground surface of a panel.
Figure 9:
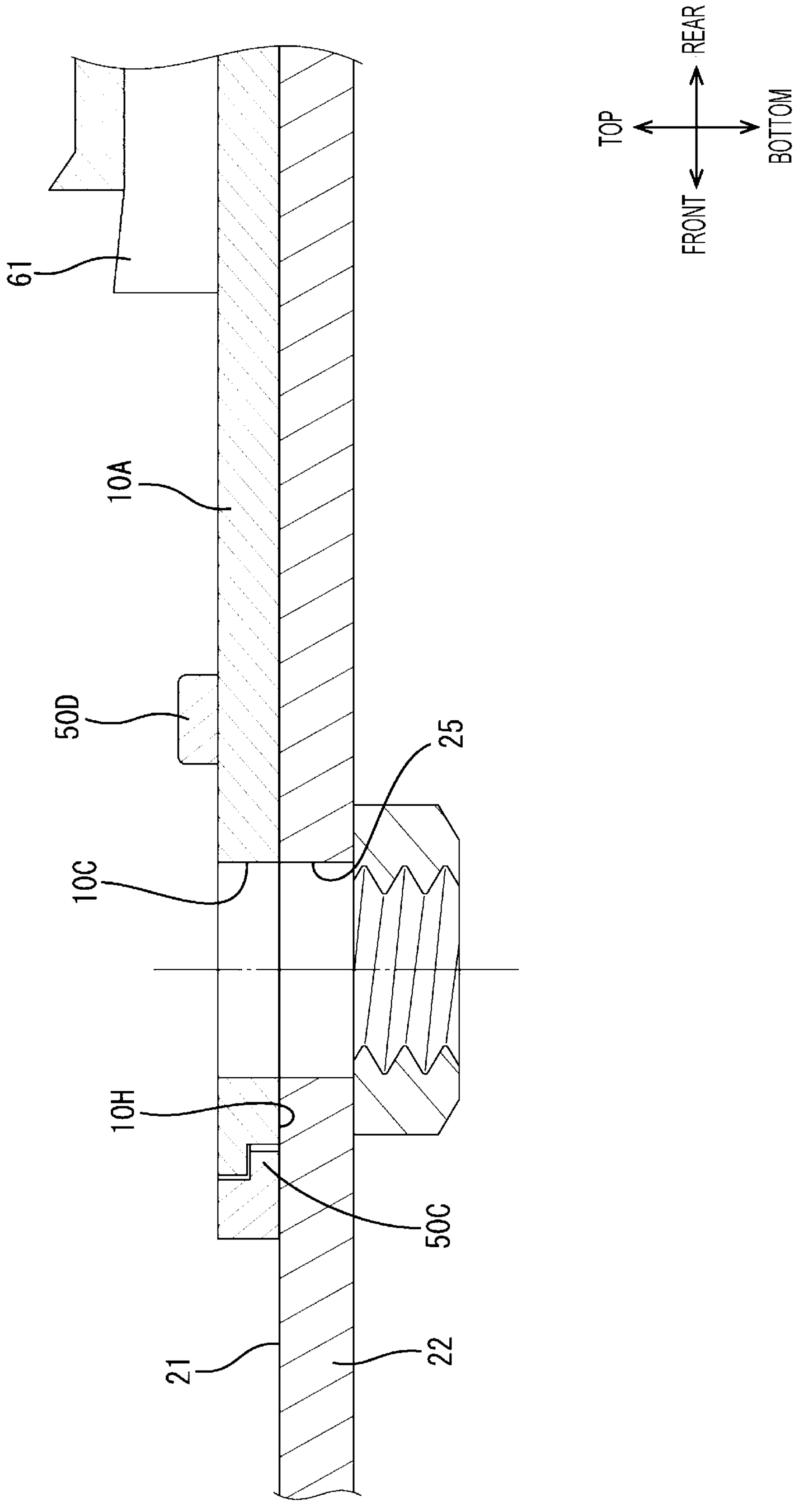
FIG. 9 is cross-sectional side view corresponding to FIG. 7.

Thus, as shown in FIG. 6, the main body portion 50A is attached to the connection portion 10A, the assembly of the holder 50 and the terminal fitting 10 is complete, and the terminal unit 1 is complete. At this time, the main body portion 50A surrounds the outer peripheral portion of the connection portion 10A outside the contact surface 10H (see FIG. 7).

Attachment of Mating Fastening Member to Terminal Unit

Next, an example of attachment of the terminal unit 1 to the mating fastening member 20 will be described. First, the terminal unit 1 is positioned on the ground surface 21 of the panel 22. At this time, the detents 50B of the holder 50 are respectively inserted into the pair of receiving holes 23 from above (see FIG. 8), and the contact surface 10H of the connection portion 10A is brought into contact with the ground surface 21 with the bolt insertion hole 10C being positioned so as to be coaxial with and communicate with the through hole 25 (see FIG. 9). The detents 50B are inserted into the receiving holes 23 to prevent the terminal fitting 10 from rotating.

Figure 10:
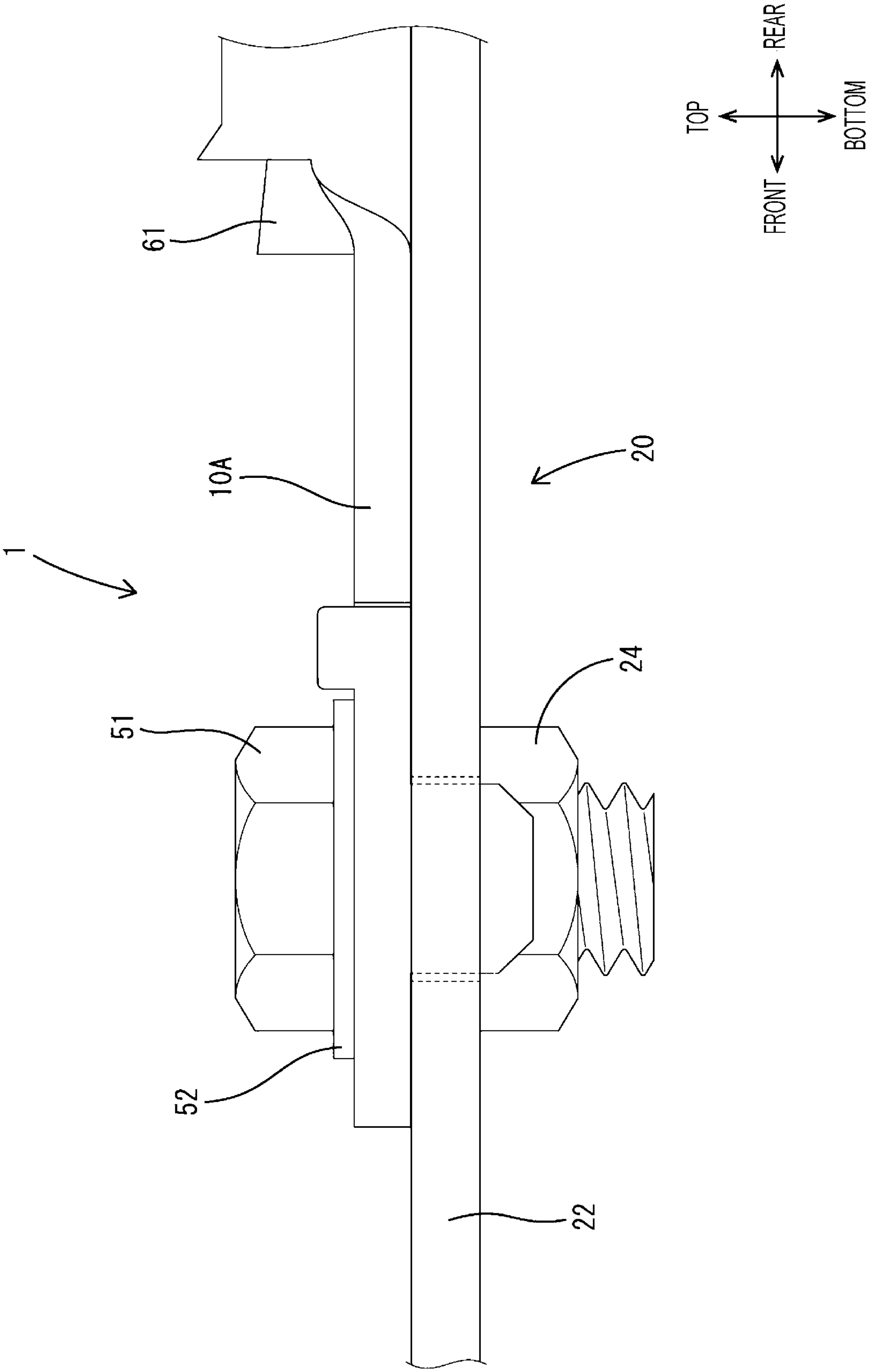
FIG. 10 is a side view showing a state in which a bolt is tightened.

Next, the bolt 51 that is inserted into a washer 52 is inserted into the bolt insertion hole 10C of the connection portion 10A from above. Thereafter, the bolt 51 is screwed into the metal nut 24, and thereafter the bolt 51 is tightened using a tool (see FIG. 10). Thus, the attachment of the terminal unit 1 to the mating fastening member 20 is complete.

Next, the actions and effects of the first embodiment will be described.

The terminal unit 1 according to the present disclosure includes a terminal fitting 10 and a holder 50. The terminal fitting 10 includes a connection portion 10A in which a bolt insertion hole 10C is formed. The holder 50 includes a main body portion 50A that is to be attached to the connection portion 10A, and detents 50B that protrude from the main body portion 50A and prevent the terminal fitting 10 from rotating. With this configuration, the main body portion 50A of the holder 50 is configured to be attached to the connection portion 10A of the terminal fitting 10. Therefore, it is unnecessary to newly manufacture a mold for the terminal fitting 10, and it is possible to mold the detents 50B of the holder 50 so that the positions thereof match the mating fastening member 20 (connection target) to which the connection portion 10A is to be connected, and easily address changes in the contact position between the terminal fitting 10 and the mating fastening member 20.

The lower surface of the connection portion 10A of the terminal unit 1 according to the present disclosure is provided with a contact surface 10H for establishing an electrical connection, and the main body portion 50A surrounds the outer peripheral portion of the connection portion 10A outside the contact surface 10H. With this configuration, the holder 50 does not prevent the contact surface 10H of the connection portion 10A and the mating fastening member 20 from coming into contact with each other, so that the electrical connection performance between the terminal fitting 10 and the mating fastening member 20 is not impaired.

A recess 10E is formed in the outer peripheral surface side of the contact surface 10H in the outer peripheral edge of the connection portion 10A of the terminal unit 1 according to the present disclosure, and the holder 50 includes a first pressing portion 50C that is fitted to the recess 10E. With this configuration, the first pressing portion 50C enables the holder 50 to be held by the terminal fitting 10.

In the terminal unit 1 according to the present disclosure, the main body portion 50A has a U shape in a plan view, and surrounds a region from the left and right end portions to the front end portion of the connection portion 10A. With this configuration, it is possible to attach the main body portion 50A to the connection portion 10A by inserting the main body portion 50A into the connection portion 10A from the front side, and therefore it is easier to fit the first pressing portion 50C to the recess 10E.

The holder 50 of the terminal unit 1 according to the present disclosure includes a second pressing portion 50D that bridges between left and right end portions of the main body portion 50A and is able to sandwich and hold the connection portion 10A, together with the first pressing portion 50C. With this configuration, the first pressing portion 50C and the second pressing portion 50D sandwich and hold the connection portion 10A, and thus the holder 50 can more desirably hold the terminal fitting 10. Furthermore, the second pressing portion 50D bridges between the left and right end portions of the main body portion 50A, and therefore, it is possible to make the main body portion 50A less deformable.

The second pressing portion 50D of the terminal unit 1 according to the present disclosure is provided on the opposite side of the first pressing portion 50C with respect to the bolt insertion hole 10C. With this configuration, the first pressing portion 50C and the second pressing portion 50D surround the head of the bolt 51 inserted into the bolt insertion hole 10C. Therefore, the second pressing portion 50D restricts the holder 50 from being moved by the head of the bolt 51 in a direction in which the holder 50 becomes detached from the connection portion 10A, and the main body portion 50A can be made less likely to become detached from the connection portion 10A.

In the terminal unit 1 according to the present disclosure, the holder 50 includes a pair of protruding locking portions 50E respectively on the two edge portions thereof in the left-right direction, and the connection portion 10A includes a pair of locking recesses 10D respectively in the two edge portions thereof in the left-right direction, to which the locking portions 50E are fitted and locked. With this configuration, it is possible to more reliably prevent the main body portion 50A from becoming detached from the connection portion 10A.

Other Embodiments

The present disclosure is not limited to the first embodiment described with the above descriptions and drawings, but is indicated by the claims. The present invention includes all modifications within the meaning of equivalents to the claims and within the scope of the claims, and is intended to include the following embodiments.

(1) Unlike in the first embodiment, a pair of locking portions that each have a protruding shape may be provided on end portions of the connection portion in the left-right direction, and a pair of locking recesses that each have a recessed shape and to which the locking portions are fitted and locked may be provided in end portions of the main body portion in the left-right direction. That is to say, end portions of either one of the main body portion and the connection portion in the left-right direction may be provided with a pair of locking portions that each have a protruding shape, and end portions of the other in the left-right direction may be provided with a pair of locking recesses that each have a recessed shape. In addition, the number of locking portions and the number of locking recesses may be one or three or more.

(2) Unlike in the first embodiment, the detents of the holder may be provided so as to extend along, and so as to be brought into contact with, the outer peripheral surface of a nut welded to the upper surface (mounting surface) of the panel. Alternatively, the detents may be provided so as to extend along, and so as to be brought into contact with, the outer peripheral surface of the head of a stud bolt welded to the upper surface of the panel. With this configuration, it is possible to omit the step of forming receiving holes in the panel.

(3) Unlike in the first embodiment, a connection portion provided rearward of the locking recesses may be bent in a direction in which the connection portion rises from the panel.

Figure 11:
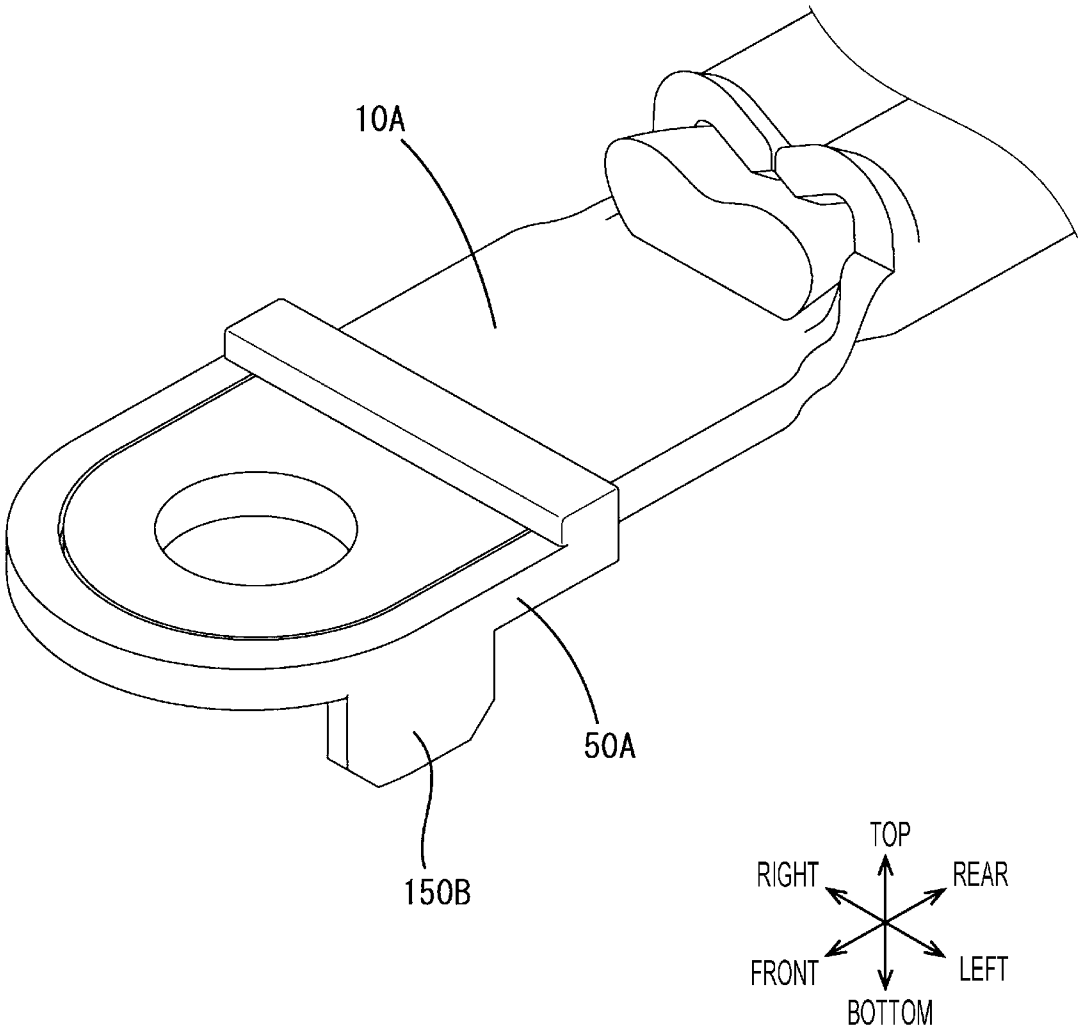
FIG. 11 is a perspective view showing a detent in another embodiment.
Figure 12:
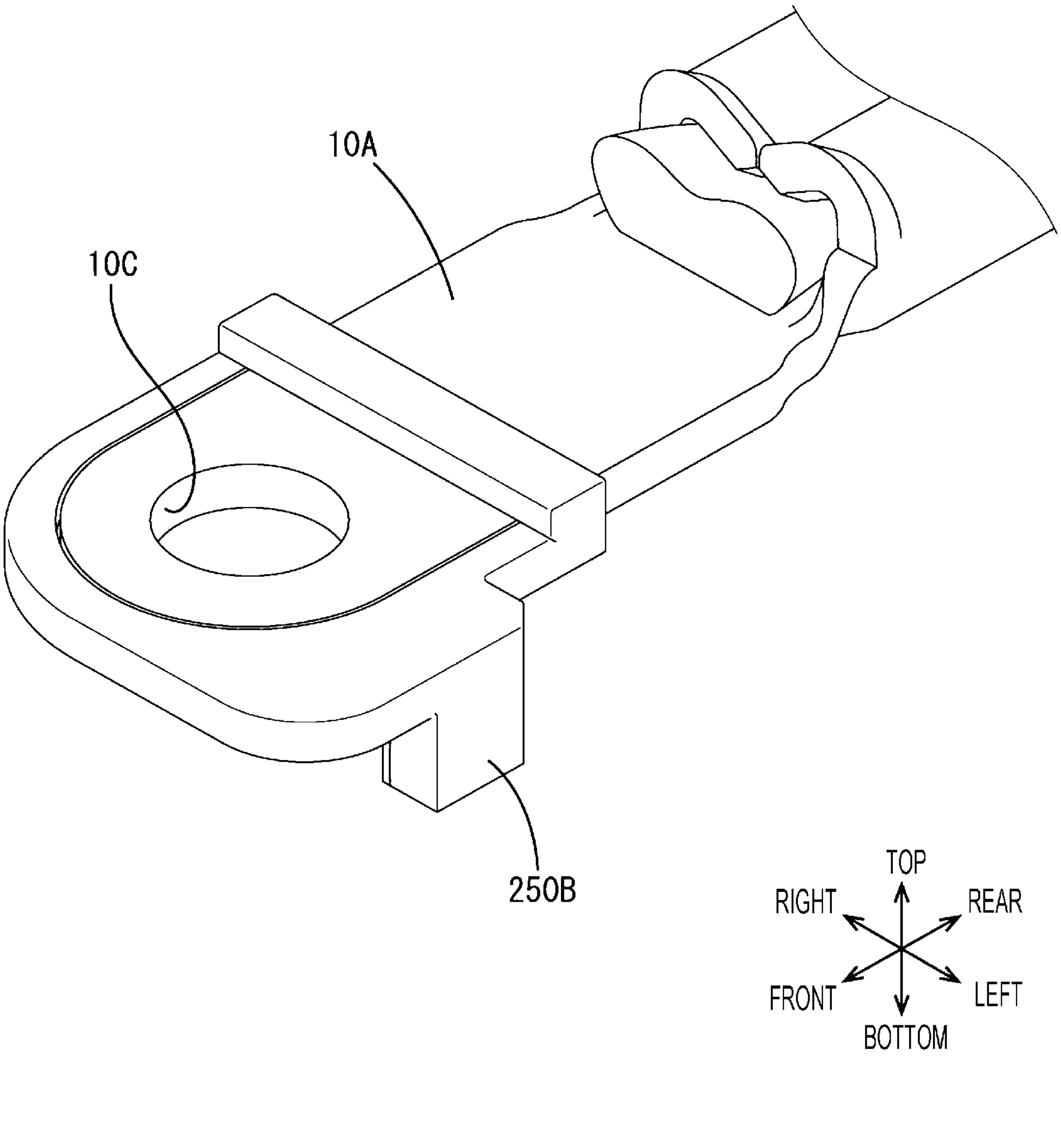
FIG. 12 is a perspective view showing a detent in another embodiment.
Figure 13:
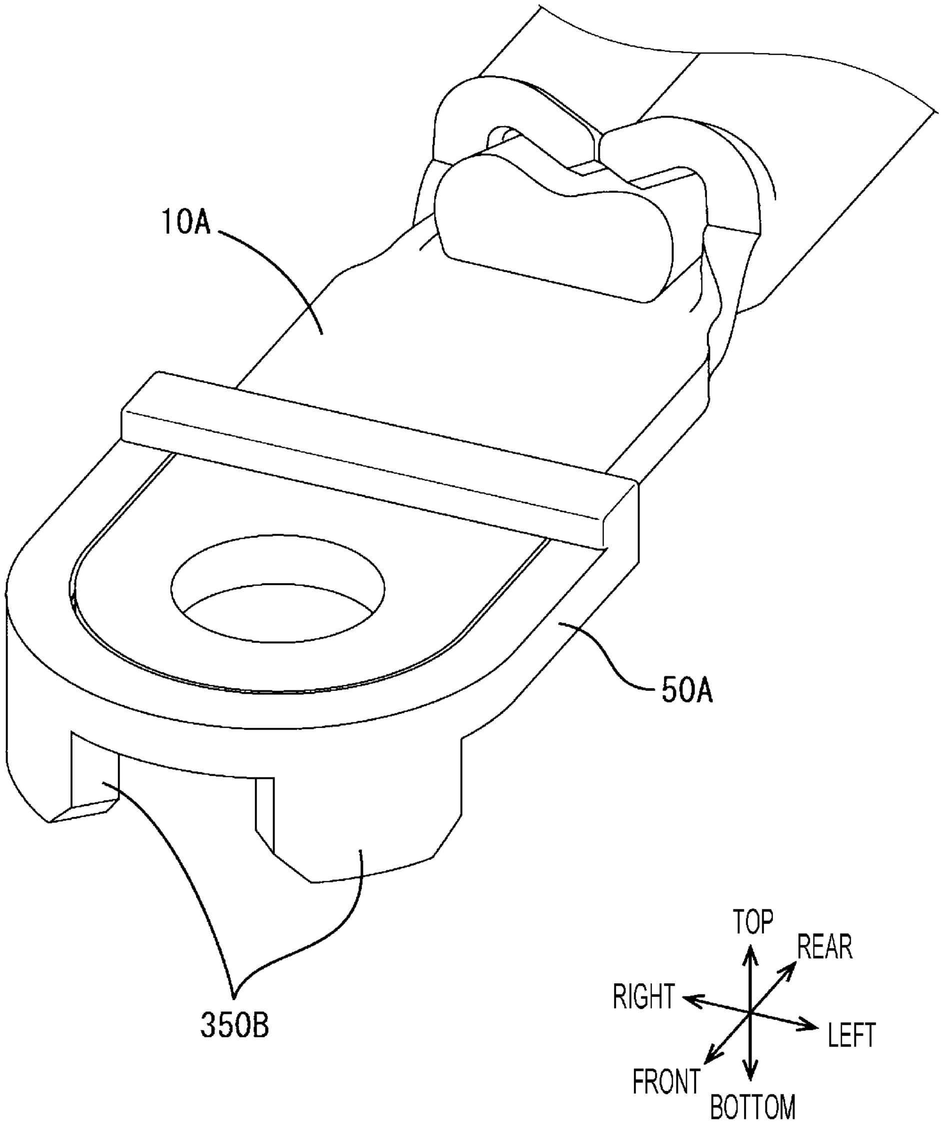
FIG. 13 is a perspective view showing a detent in another embodiment.

(4) The configurations of the detents for the holder may be different from those in the first embodiment. For example, as shown in FIG. 11, a detent 150B may be provided so as to protrude downward from one of the left and right portions of the lower surface of the main body portion 50A. Furthermore, as shown in FIG. 12, a detent 250B may be provided at a distance from the bolt insertion hole 10C in the connection portion 10A. Also, as shown in FIG. 13, a pair of detents 350B may be provided on the main body portion 50A at positions close to the front end portion thereof. The number of detents may be three or more. In short, the detent(s) may be formed according to the connection position between the terminal fitting and the connection target.

(5) Unlike in the first embodiment, a plurality of first pressing portions may be provided so as to protrude inward (like internal gears) from the main body portion at intervals therebetween.

Figure 14:
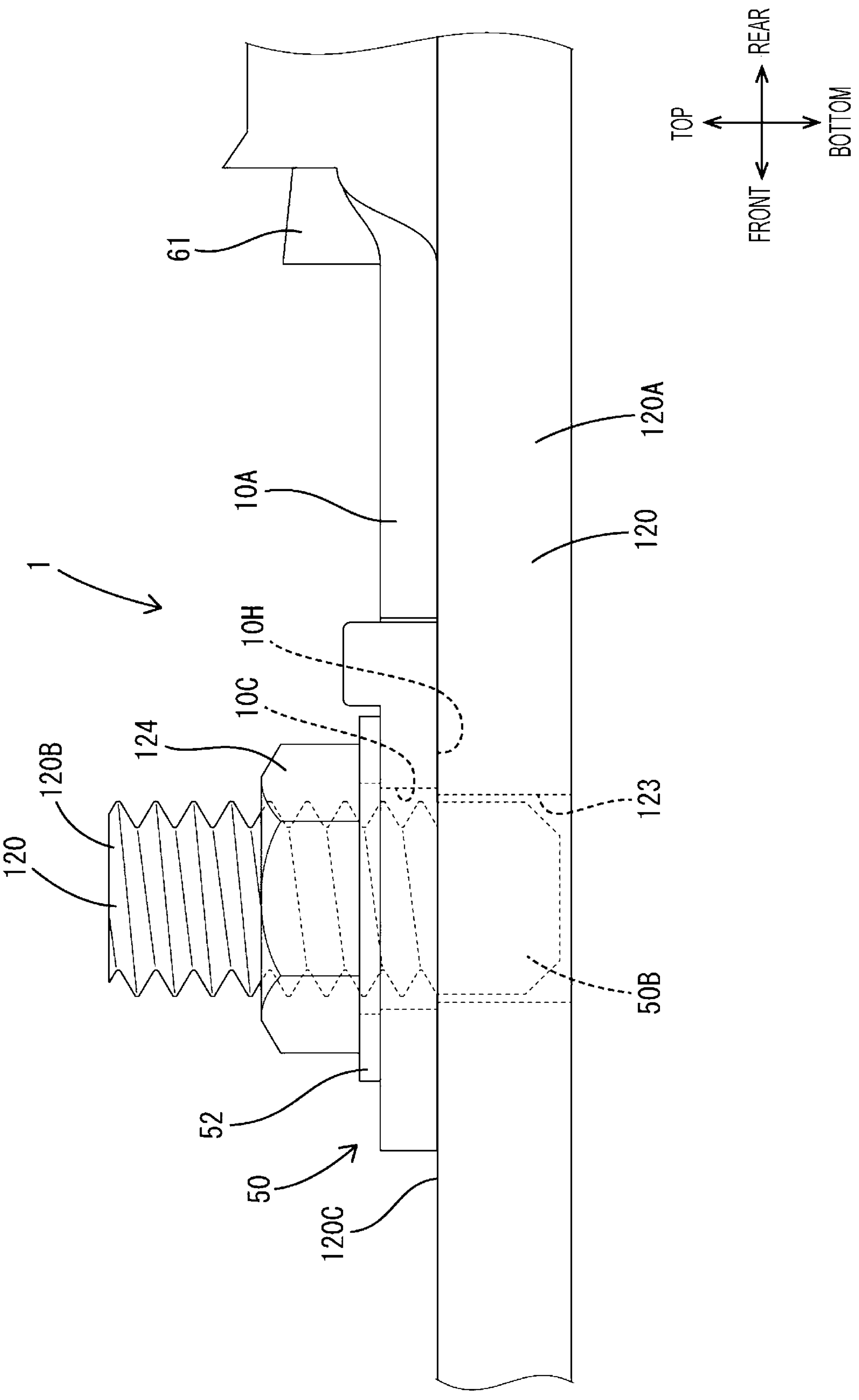
FIG. 14 is a side view showing another embodiment in which a mating fastening member is a starter.

(6) In the first embodiment, the mating fastening member are designed to ground components, but the mating fastening member may be applied to a power source, a signal circuit, or the like. For example, as shown in FIG. 14, a mating fastening member 120 may be a starter. The mating fastening member 120 include a fastening main body portion 120A and a stud bolt 120B. The fastening main body portion 120A is provided with a pair of receiving holes 123. The opening of each of these receiving holes 123 has a rectangular shape that is elongated in the front-rear direction. The pair of receiving holes 23 are located so as to sandwich the stud bolt 120B in the left-right direction. The stud bolt 120B protrude upward from the upper surface of the fastening main body portion 120A. The upper surface of the fastening main body portion 120A is a mating contact surface 120C. The stud bolt 120B is coupled to the fastening main body portion 120A so as to be integrated therewith. In the terminal unit 1, the detents 50B of the holder 50 are respectively inserted into the pair of receiving holes 123 from above, and the stud bolt 120B is inserted into the bolt insertion hole 10C. In the terminal unit 1, the contact surface 10H is in contact with the mating contact surface 120C. The washer 52 is fitted onto the stud bolt 120B so as to overlap the terminal unit 1 from above, and a nut 124 is tightened from above the washer 52.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal unit comprising:

a terminal fitting; and a holder, wherein the terminal fitting includes:

a connection portion in which a bolt insertion hole is formed;

a contact surface provided on a lower surface of the connection portion to establish an electrical connection; and a recess defined in an outer peripheral surface side of the contact surface in an outer peripheral edge of the connection portion, and the holder includes:

a main body portion that is configured to be attached to the connection portion and surrounds an outer peripheral portion of the connection portion outside the contact surface;

a detent that protrudes from the main body portion and prevents the terminal fitting from rotating;

a first hole that exposes the contact surface;

a first pressing portion that is disposed below the connection portion and configured to be fitted to the recess; and a second pressing portion that is disposed on the connection portion, bridges between left and right end portions of the main body portion, and is configured to sandwich and hold the connection portion, together with the first pressing portion.

2. The terminal unit according to claim 1, wherein the main body portion has a U shape in a plan view, and surrounds a region from the left and right end portions to a front end portion of the connection portion.

3. The terminal unit according to claim 1, wherein the second pressing portion is provided on the opposite side of the first pressing portion with respect to the bolt insertion hole.

4. The terminal unit according to claim 1, wherein either one of the holder and the connection portion includes a pair of protruding locking portions respectively on two edge portions thereof in a left-right direction, and the other includes a pair of locking recesses respectively in two edge portions thereof in the left-right direction, to which the locking portions are fitted and locked.

5. The terminal unit according to claim 1, wherein the first hole has a size larger than a size of the bolt insertion hole to enclose the bolt insertion hole in a plan view.

* * * * *